United States Patent [19]
Wirth

[11] Patent Number: 4,745,996
[45] Date of Patent: May 24, 1988

[54] BRAKE RING FOR BRAKE DISKS, ESPECIALLY OF DISK BRAKES FOR RAIL VEHICLES

[75] Inventor: Xaver Wirth, Ismaning, Fed. Rep. of Germany

[73] Assignee: Knorr-Bremse GmbH, Munich, Fed. Rep. of Germany

[21] Appl. No.: 423,338

[22] Filed: Sep. 24, 1982

[30] Foreign Application Priority Data

Oct. 19, 1981 [DE] Fed. Rep. of Germany ....... 3141434

[51] Int. Cl.⁴ .................... F16D 65/12; F16D 65/847
[52] U.S. Cl. .......................... 188/218 XL; 188/264 A
[58] Field of Search ........... 188/71.6, 218 XL, 218 R, 188/73.2, 73.1, 366, 367, 264 AA, 264 A, 18 A, 58; 192/107 T, 107 R, 113 A, 70.12, 70.14

[56] References Cited

U.S. PATENT DOCUMENTS

| | | | |
|---|---|---|---|
| 1,453,599 | 5/1923 | Parker | 188/218 XL |
| 2,215,420 | 9/1940 | Eksergian | 188/218 XL |
| 2,255,023 | 9/1941 | Eksergian | 188/218 XL |
| 2,464,754 | 3/1949 | Tack | 188/218 XL |
| 2,629,464 | 2/1953 | Helsten | 188/218 XL |
| 3,391,763 | 7/1968 | Severson | 188/264 AA X |
| 3,899,054 | 8/1975 | Huntress et al. | 188/218 XL |

FOREIGN PATENT DOCUMENTS

| | | | |
|---|---|---|---|
| 0077433 | 4/1983 | European Pat. Off. | 188/218 XL |
| 1164455 | 8/1959 | Fed. Rep. of Germany . | |
| 2505205 | 1/1976 | Fed. Rep. of Germany . | |
| 2083987 | 12/1971 | France . | |
| 2211080 | 7/1974 | France . | |
| 2307186 | 4/1975 | France . | |
| 7901105 | 12/1979 | PCT Int'l Appl. . | |
| 2024966 | 1/1980 | United Kingdom | 188/218 XL |
| 2060796 | 5/1981 | United Kingdom . | |

*Primary Examiner*—Douglas C. Butler
*Attorney, Agent, or Firm*—Pollock, Vande Sande & Priddy

[57] ABSTRACT

A brake ring for brake disks, especially disk brakes for rail vehicles, consisting of two annular bodies (2, 3) arranged adjacently at a distance from each other, having stud bolts (7) bridging the distance and rigidly connected with the annular bodies (2, 3). These stud bolts are so arranged, for the purpose of the most even distribution possible, that their axes (8) extend through the intersecting points of three systems of straight lines (9, 10 and 11) extending in one radial plane. The straight lines of the first system (9) are parallel and are at an equal distance from each other, the second system of straight lines (10) is formed by a rotation by 60° and the third system of straight lines is formed by a rotation by 120° of the first system of straight lines (9). Preferably, the ratio of the distance (A) of the stud bolt axes (8) and the diameter (D) of the stud bolts (7) is approximately 1.7. The brake ring has only minor aeration losses but high heat transmission by cooling air. When the brake ring heats up, the stresses within the annular bodies (2, 3) and the stud bolts (7) are evenly distributed, and the risk of fracture is reduced.

5 Claims, 2 Drawing Sheets

BRAKE RING FOR BRAKE DISKS, ESPECIALLY OF DISK BRAKES FOR RAIL VEHICLES

SUMMARY OF THE INVENTION

The invention relates to a brake ring for brake disks, especially disk brakes for rail vehicles, having two annular bodies arranged adjacently at a distance from each other, being acted upon by brake shoes at their outer surfaces which face away from each other, and having stud bolts bridging the distance between the said annular bodies, being held at the annular bodies and being at least approximately evenly distributed at a distance from each other and parallel to the axis of the brake disk.

BACKGROUND OF THE INVENTION

A brake disk of the aforementioned type is known from German patent No. 1,164,455, in which the stud bolts, as seen from a radial direction, are arranged in the manner of perforated fan blades of an axial flow fan wheel, i.e., in radial direction or along a line corresponding to the curved shape of a fan blade in a spaced sequence, one after the other, and having a cross section which approximates the cross section of a fan blade at that respective point, the stud bolts having approximately triangular, semi-circular, rectangular or rhomboid cross-sections. In an arrangement of stud bolts corresponding to the curved fan blades, the cross-sections and the spacing of the stud bolts may be so designed that fan blades suitable for operation in both directions of rotation are reproduced. All of the prior art arrangements, however, have the disadvantage that the stud bolts cannot be designed at all points of the brake ring at equal distances from each other and/or with identical cross-sectional surfaces, so that considerable deviations from a evenly distributed in such a manner that the stud bolts in all areas of the brake ring are equidistant from each other. Because of the uneven distribution of the stud bolts, different stresses arise within the brake ring and the stud bolts during a rise in the temperature of the brake ring, causing differing temperature fields to be generated, possibly resulting in deformations along the exterior sides of the annular bodies, whereby the contact of the brake shoes and thus the braking effect is diminished. These effects may increase to the level where fractures occur in the brake ring.

PURPOSE OF THE INVENTION

The object of the invention is a brake ring of the type described having the stud bolts absolutely uniformly distributed across the entire surface of the brake ring and equidistant from each other at every point, while retaining the optimum values of low aeration losses and high cooling effect, or, respectively, high heat transfer, as in German Published Application No. 25 05 205. In addition, the brake ring is to be simple and cheap to manufacture.

According to the invention, this object is achieved by arranging the stud bolts in a symmetrical pattern, as seen in radial view, the axes of the stud bolts passing through the intersecting points of three systems of straight lines located in one radial plane, the first system of straight lines comprising a number of straight lines which are parallel and equidistant from each other, while the second and third systems are formed by a rotation of the first system of straight lines by 60° and 120°, respectively. The arrangement of the stud bolts in the pattern determined by the system of straight lines results in a completely uniform distribution of the stud bolts in both the circumferential and the radial direction across the surface of the brake ring, and at every point the stud bolts are precisely equidistant from each other. This equal distance of the stud bolts at every point results in a completely uniform distribution of the stresses within the annular bodies and the stud bolts, and thus excludes local deformations of the said annular bodies, so that there is uniform wear of the outer sides of the annular bodies, providing the prerequisite for a uniform temperature distribution. At the same time, the arrangement of the stud bolts causes the cooling air to perform numerous detours so that a low air flow rate and correspondingly low aeration loss results in a high heat transfer and thus a good cooling effect of the brake ring.

At the present time, rail vehicles use many kinds of disk brakes whose brake disks have brake rings with radially arranged continuous aeration fins. In order to facilitate the replacement of these brake disks by brake rings designed in accordance with the present invention, having substantially lower aeration losses, improved cooling and lower temperature stresses with reduced risk of fracture, and for the purpose of obtaining equal masses and thus equal heat absorptive capacity, particularly in stoppages where the cooling by aeration plays only a minor role, the arrangement and the design of the stud bolts, according to a further aspect of the invention, are so dimensioned that the ratio of the distance of the points of intersection to the diameter of the cylindrical stud bolts is about 1.7. A particularly trouble-free replacement of the known brake rings is possible if, according to a continued development of the invention, the distance is about 38 mm and the diameter of the stud bolts is about 22 mm.

According to this aspect of the invention, the radially inwardly located stud bolts may be provided with reinforcing ribs shaped into one piece with them, extending axially and radially inward, forming retaining flange, known per se.

BRIEF INTRODUCTION TO THE DRAWINGS

An embodiment of the invention will now be described with reference to the accompanying drawings, in which.

DESCRIPTION OF THE PREFERRED EMBODIMENT

Figure 1:
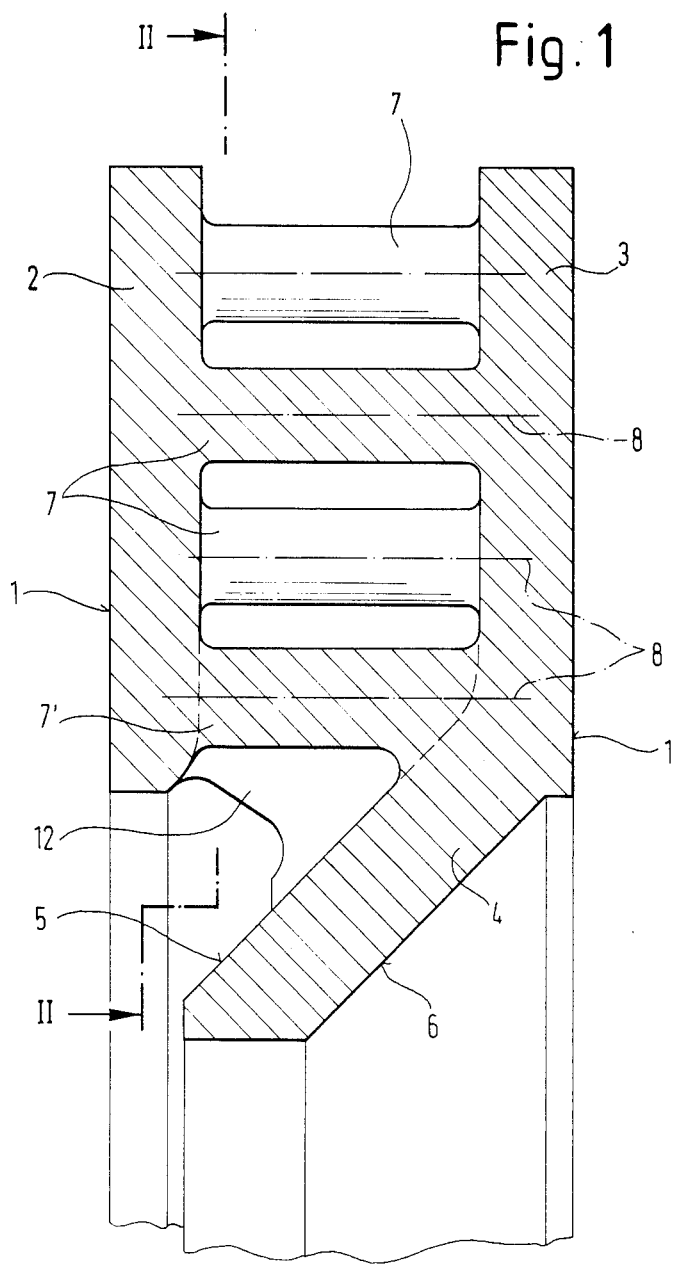
FIG. 1 shows an axial section through a brake ring.

The brake ring has two annular bodies 2 and 3, arranged side by side at a distance from each other, and contacted at their outer sides 1, facing away from each other, by brake shoes (not shown), one of the annular bodies (3) having a radially inwardly extending retaining flange 4. Retaining flange 4 has parallel conical surfaces 5 and 6 on both sides, by means of which it can be tensioned between corresponding conical surfaces of a hub (not shown). The design of retaining flange 4 and its retention at the hub is the same as disclosed in German Published Application No. 28 28 101, and does not require further description.

Figure 2:
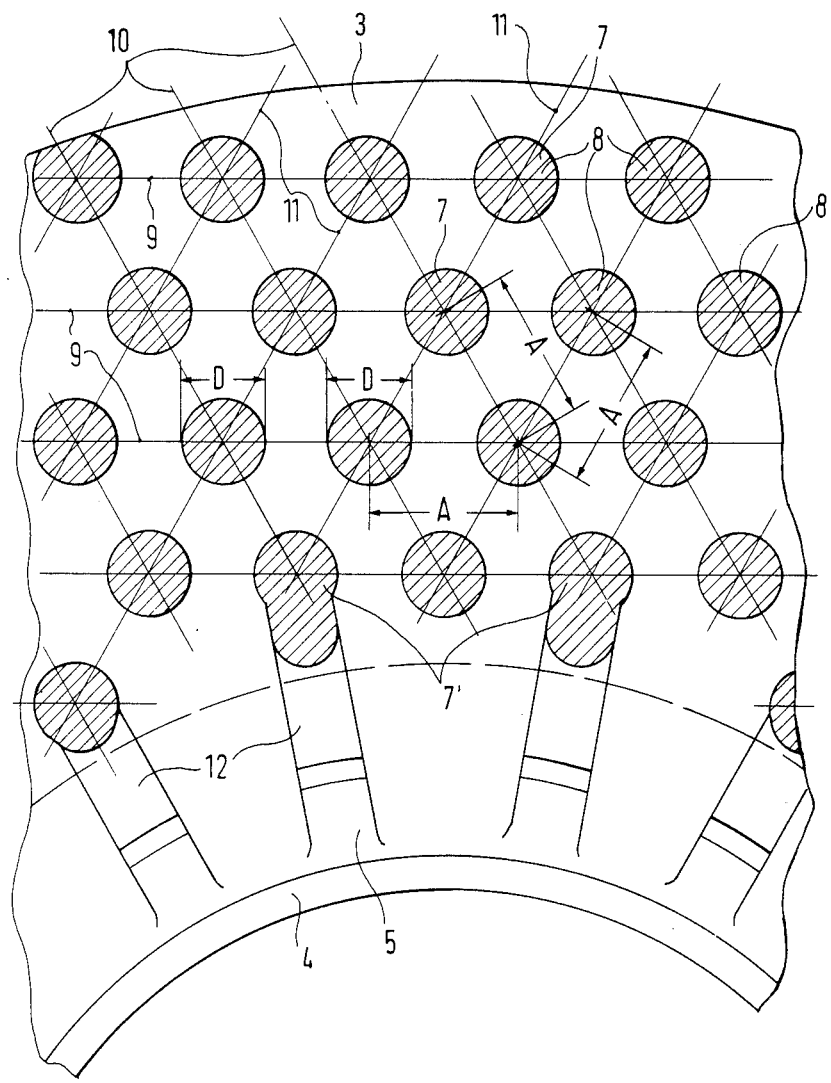
FIG. 2 is a section view along line II—II in FIG. 1.

Stud bolts 7 having round cross sections extend between the two annular bodies 2 and 3, being rigidly connected thereto and preferably cast as one piece with them. As can be seen in FIG. 2, stud bolts 7 are arranged absolutely uniformly across the entire surface of the brake ring in a certain pattern: the axes 8 of stud bolts 7 pass through the intersecting points of three systems of straight lines 9, 10, and 11, said systems being located in one radial plane, i.e., the drawing plane of FIG. 2. The first of the systems 9 comprises equidistant, parallel straight lines; in FIG. 2 these straight lines happen to be parallel to the upper or, respectively, the lower rim of the drawing. The second system of straight lines 10 is formed by a rotation in a clockwise direction of the first system by 60°, and the third system of straight lines 11 is formed by a rotation in a clockwise direction of the first system 9 by 120°. Therefore, all axes 8 of stud bolts 7, or, respectively, all intersecting points of the systems of straight lines 9, 10 and 11 have the identical distance A to the neighboring axes 8 or, respectively, the intersecting points of the straight lines.

All of the stud bolts have substantially the same diameter D; the dimensions have been so chosen that the ratio of the distance A of the axes 8 of stud bolts 7, or, respectively, of the intersecting points of the systems of straight lines 9, 10 and 11 to diameter D of stud bolts 7 is at least approximately 1.7. In a brake ring for a rail vehicle disk brake with conventional dimensions, e.g., with an outer diameter of 640 mm and a reciprocal distance of the outer sides 1 of 110 mm, the distance A is preferably 38 mm, and the diameter D 22 mm. These dimensions provide a brake ring with a mass corresponding to the brake rings commonly used for rail vehicles at the present time, having radially extending continuous aeration fins between their annular bodies. A brake ring with such dimensions is therefore especially suitable as a replacement of the brake rings heretofore used in disk brakes for rail vehicles and it can be used for retrofitting these without difficulty. There is no difference in the mechanical stresses because of the equivalency in mass of the known and of the new brake rings, and this applies also to the heat absorption or, respectively, retention capacity of the brake rings, which is essential particularly in stoppage braking of the rail vehicle resulting in a largely missing aeration cooling effect. During travel of the rail vehicle, the new brake ring has substantially lower aeration losses, and during brake applications while the rail vehicle remains in motion, e.g., during slope descents, the improved heat transfer from the brake ring to the cooling air provides lower temperatures than heretofore, in spite of the lower flow rate of cooling air. The entirely uniform distribution of the stud bolts 7 with their relatively minor distance A results in a totally uniform and good bracing of annular bodies 2 and 3, so that their outer surfaces 1 cannot be deformed even by high temperature increases during brake applications, and at the same time assures uniform distribution of stresses within annular bodies 2 and 3 and stud bolts 7. The totally uniform distribution of the stud bolts requires that, especially at the radially outside rim of the brake ring, the circumferential limits of its rim shear some of the stud bolts, having a cross section in the shape of the segment of a circle. It is a particular advantage that the stud bolt arrangement can be used for brake rings with varying diameters, the distance A and the diameter D therefore can be given constant values for brake rings of different diameters. Accordingly, it is also possible to produce, from an available brake ring, one with a smaller outer diameter by simply machining off a part of its outer circumference, while the functional advantages of the brake ring caused by the arrangement of the stud bolts 7 are fully retained.

Reinforcing ribs 12, extending axially and radially inwards with respect to the retaining flange, are formed as one piece with the radially inward located stud bolts 7', as can be seen in FIGS. 1 and 2. These reinforcing ribs 12 in practice do not interfere with the distribution pattern of stud bolts 7, yet result in a good connection of annular bodies 2 and 3 and thus of the entire brake ring with retaining flange 4.

In a modification of the above described embodiment, stud bolts 7 may be designed with other cross-sectional shapes, e.g., squares or hexagons. In addition, another mount for the brake ring may be chosen; thus, a different attachment device for the brake ring may be provided instead of the retaining flange 4 with its conical surfaces 5 and 6.

The points of attachment of stud bolts 7 and 7', respectively, on annular bodies 2 and 3 must be well rounded, so that stresses occurring particularly at these spots during changes in temperature or, respectively, different temperatures within these components, are kept to a minimum. The optimum radius of curvature can be calculated by means of the pertinent material and dimensional data, with consideration not only of those stresses occurring immediately at the surface of the points of attachment, but also those underneath that surface and the interior.

What is claimed is:
1. Brake ring for a brake disk, especially for a rail vehicle, comprising
    (a) two annular bodies (2, 3), arranged at a distance adjacent to one another, their outer surfaces (1) facing away from each other and subjected to the action of brake shoes;
    (b) stud bolts (7) bridging the entire distance between said annular bodies (2, 3), said stud bolts being attached to said annular bodies (2, 3) and being substantially uniformly and uninterruptedly distributed over their entire surfaces at a distance (A) from each other and parallel to the axis of said brake disk, said stud bolts (7), as seen in axial direction, being arranged in a symmetrical pattern, the axes (8) of said stud bolts (7) extending through the intersecting points of three systems, of straight lines (9, 10 and 11) located in one radial plane, the first of these systems of straight lines (9) consisting of straight, parallel lines and the second and third of these systems of straight lines (10 and 11) being formed by rotating said first system of straight lines (9) 60° and 120°, respectively.

2. Brake ring according to claim 1, wherein said stud bolts (7) are cylindrical, and the ratio of the distance (A) of said intersecting points to the diameter (D) of said stud bolts (7) is about 1.7.

3. Brake ring according to claim 2, wherein said distance (A) is about 38 mm and said diameter (D) of said stud bolts (7) is about 22 mm.

4. Brake ring according to any one of claims 1 to 3, comprising reinforcing ribs (12) unitary with the radially inner stud bolts (7'), and extending axially and radially inward to form a retaining flange (4).

5. Brake ring according to any one of claims 1 to 3, wherein the points of attachment of said stud bolts (7, 7') to said annular bodies (2, 3) are curved.

* * * * *